United States Patent [19]

Huthcins, IV et al.

[11] 3,710,781
[45] Jan. 16, 1973

[54] CATHETER TIP PRESSURE TRANSDUCER

[76] Inventors: Thomas B. Huthcins, IV, 310 N.W. Brynwood Lane, Portland, Oreg. 97229; Miles Lowell Edwards, 13191 Sandhurst Place, Santa Ana, Calif. 92705

[22] Filed: Oct. 12, 1970

[21] Appl. No.: 80,020

[52] U.S. Cl. .................. 128/2.05 D, 73/393, 73/398, 128/2.05 E
[51] Int. Cl. .............................................. A61b 5/02
[58] Field of Search ........ 128/2 R, 2 S, 2.5 D, 2.05 F, 128/2.05 F, 2.05 R, 2.1 R; 23/393, 398 AR, 398 R, 409

[56] References Cited

UNITED STATES PATENTS

| | | |
|---|---|---|
| 3,088,323 | 5/1963 | Welkowitz et al. ............. 73/398 AR |
| 3,490,441 | 1/1970 | Curtis .............................. 128/2.05 D |
| 3,267,932 | 8/1966 | Valliere ........................... 128/2.05 D |
| 3,196,375 | 7/1965 | Jones .............................. 128/2.05 D |
| 2,634,721 | 4/1953 | Greenwood, Jr. ............... 128/2.05 D |
| 3,329,023 | 7/1967 | Kurtz et al. ..................... 73/398 AR |
| 3,424,000 | 1/1969 | Chelner et al. .................. 73/398 AR |

*Primary Examiner*—William E. Kamm
*Attorney*—Lee R. Schermerhorn

[57] ABSTRACT

A support member has a tubular shank end secured in the end of a catheter tube. A pair of elongated pressure transducer elements is mounted in opposite sides of the support. A flexible rubber sleeve sheathes the support and transducer elements and transmits external fluid pressure to outer faces of the transducer elements. Atmospheric pressure is communicated to inner faces of the transducer elements through said tubular shank and a lumen in the catheter tube.

6 Claims, 9 Drawing Figures

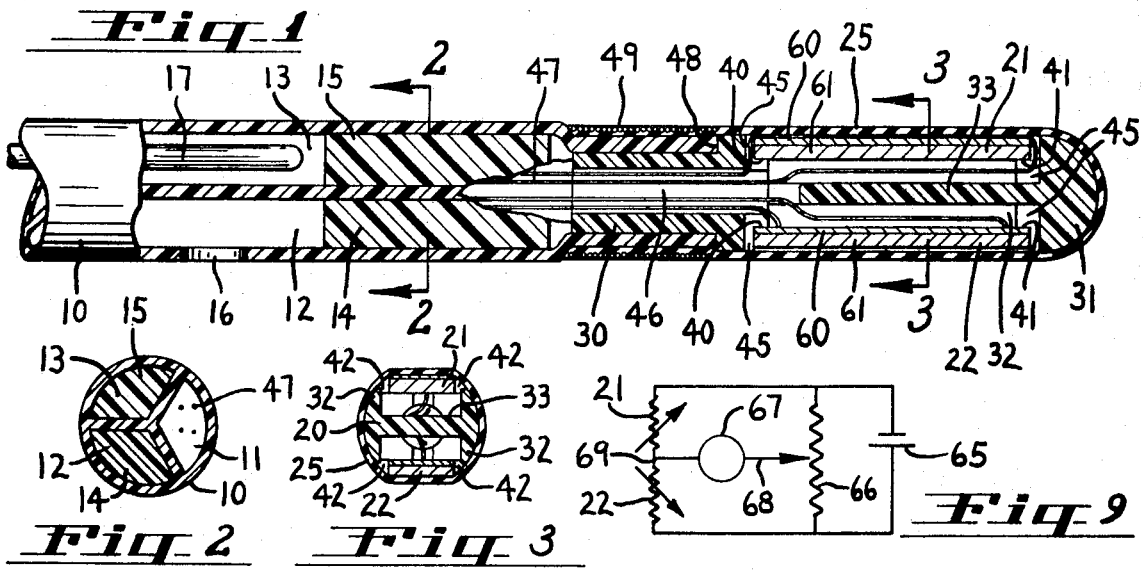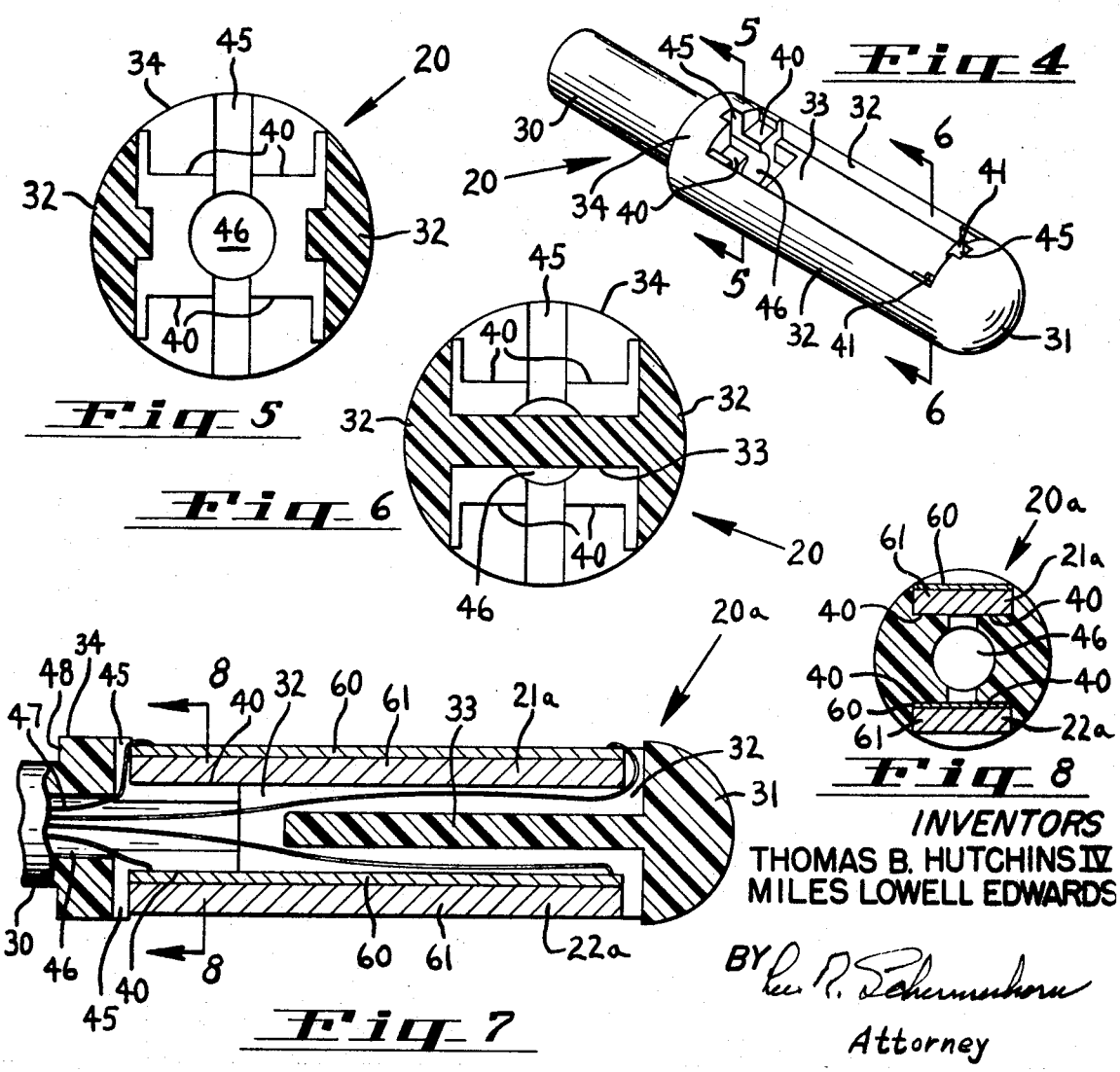
INVENTORS
THOMAS B. HUTCHINS IV
MILES LOWELL EDWARDS
BY Lee R. Schermerhorn
Attorney

CATHETER TIP PRESSURE TRANSDUCER

BACKGROUND OF THE INVENTION

This invention relates to a blood pressure measuring device in a catheter which is adapted to be introduced into a blood vessel in the body and has particular reference to a pressure transducer of high sensitivity and quick response which is capable of measuring and recording pressure wave forms in the blood for analysis of heart conditions and other purposes.

Devices heretofore proposed for this purpose have not been sufficiently sensitive and have not had sufficiently quick response to satisfy the needs of the medical profession. One reason for this is the small size of a catheter tip which requires miniaturization of the transducer. In previous devices the diaphragm area has been too small to respond accurately to the small changes in the blood pressure which are sought to be measured. The physician is interested not only in maximum and minimum values but also in the wave forms which intervene between the peaks and valleys of the pressure variations. Prior catheter pressure transducers have not been reliable for this purpose.

Objects of the present invention are, therefore, to provide an improved catheter tip pressure transducer, to provide a catheter for measuring blood pressure which is more sensitive and has quicker response to pressure variations than conventional devices, to provide a catheter tip pressure transducer capable of measuring and recording blood pressure wave forms, to provide a catheter tip pressure transducer which has a relatively large diaphragm area exposed to blood pressure, to provide a transducer of the type described which is compensated for variations in temperature and atmospheric pressure, and to provide a device of the type described which is of relatively simple and inexpensive construction suitable for use as a disposable device.

SUMMARY OF THE INVENTION

In the present construction the desired qualities of sensitivity and quick response are obtained by providing an elongated diaphragm area on one or more sides of the catheter. Thus, the area exposed to the blood pressure to be measured may be made many times the cross sectional area of the catheter which is an inherent limitation where the end of the catheter is utilized for transmitting the blood pressure to the sensitive element. In the preferred embodiments described herein, two such diaphragm areas are provided, on opposite sides of the catheter, utilizing a pair of pressure sensitive elements connected in a bridge circuit so as to be temperature compensated. The tip of the catheter including the pressure sensitive elements is enclosed in a flexible sheath which transmits external fluid pressure variations to the sensitive elements and provides a seal against the entrance of blood.

The invention will be better understood and additional objects and advantages will become apparent from the following description of the preferred embodiments illustrated on the accompanying drawing. Various changes may be made in the details of construction and arrangement of parts and certain features may be used without others. All such modifications within the scope of the appended claims are included in the invention.

BRIEF DESCRIPTION OF THE DRAWING

FIG. 1 is an enlarged longitudinal sectional view with parts in elevation, showing a catheter tip embodying the invention;

FIG. 2 is a view on the line 2—2 in FIG. 1;

FIG. 3 is a view on the line 3—3 in FIG. 1;

FIG. 4 is a perspective view showing the support member for the pressure transducer;

FIG. 5 is a view on the line 5—5 in FIG. 4;

FIG. 6 is a view on the line 6—6 in FIG. 4;

FIG. 7 is a view similar to FIG. 1 with parts omitted, showing a modification;

FIG. 8 is a view on the line 8—8 in FIG. 7; and

FIG. 9 is a circuit diagram for the pressure transducer elements.

DESCRIPTION OF THE PREFERRED EMBODIMENTS

The catheter tube 10 is preferably an extrusion of a suitable plastic having a plurality of lumens 11, 12 and 13 therein. Lumen 11 is left open while lumens 12 and 13 are closed at the distal end of the tube by plugs 14 and 15. A port 16 in the wall of the tube communicates with lumen 12 to provide a passageway for withdrawing blood samples or for injecting substances into the blood stream as may be desired. Lumen 13 is available for balloon inflation when it is desired to have a balloon on the catheter. A bendable wire stylet 17 may be inserted in one of the lumens to assist in guiding the catheter into a branch of the vessel. Additional lumens may be provided if desired.

A rigid support member 20 holds a pair of pressure transducer elements 21 and 22 within a flexible rubber sheath 25. Support 20 is preferably a molded plastic part and sheath 25 is preferably made of the same material as the balloons commonly used on catheters. The sheath is a cylindrical sleeve having a closed distal end enveloping and sealing support 20 and transducer elements 21 and 22 therewithin.

Support 20 has a reduced tubular shank end 30 and a closed hemispherical distal end 31. These two end portions are interconnected by a pair of opposite side wall portions 32 having outer surfaces of cylindrical curvature. An interior web portion 33 extends between side portions 32 and is integral therewith forming an I-beam cross section as shown in FIG. 3. Adjoining the shank 30 is a cylindrical end portion 34.

Cylindrical portion 34 and distal end portion 31 are provided with pairs of flat ledges 40 and 41 to seat end portions of the transducer elements 21 and 22. These ledges are spaced above and below the central web portion 33 to provide clearance between the transducer elements and web portion 33. The transducer elements are narrower than the distance between side portions 32 to provide clearance spaces 42, as shown in FIG. 3, between the side edges of the transducer elements and the side portion 32 of the support. Thus the transducer elements are mounted in elongated recesses defined by web 33 and side portions 32 as seen in FIG. 4.

Transducer elements 21 and 22 are preferably retained in seated position on ledges 40 and 41 by the resilience of the rubber sheath 25 which envelops the transducer elements, or the transducer elements may be adhesively secured to the ledges 40 and 41 if desired. Thus, the transducer elements 21 and 22 are supported by their ends on ledges 40 and 41 as simple beams subject to beam deflection in inward directions when the sheath 25 is subject to external fluid pressure. The effective diaphragm area of each transducer element exposed to such fluid pressure is equal to the width of the element multiplied by the distance between the ledges 40 and 41. This provides a large diaphragm area for quick and accurate response to slight changes in the external fluid pressure.

Transverse slots 45 in end portions 31 and 34 provide wiring passages communicating with opening 46 in tubular shank 30 for the wiring connections 47 to the transducer elements. Opening 46 communicates with the unplugged lumen 11 which conveys the wires 47 to the proximal end of the catheter tube 10. Lumen 11 and opening 46 also communicate atmospheric pressure to the inner faces of transducer elements 21 and 22 so that all blood pressure measurements are referenced to atmospheric pressure.

In assembling the support 20 in the catheter tube 10, the interior walls separating the lumens 11, 12 and 13 are removed for a distance back from the end of the tube so that the cylindrical shank 30 may be inserted and adhesively secured in the tube with the distal end of the tube abutting the shoulder 48 on the end of cylindrical portion 34, as shown in FIG. 1. Then the sheath 25 is drawn over support 20 and transducer elements 21 and 22 and the proximal end of the sheath is sealed to tube 10 by a winding of thread 49 overlying the shank 30. Winding 49 is contained within the thickness of shoulder 48 to provide a smooth transition from tube 10 to sheath 25 on the outer surface of the catheter.

In use, the fluid pressure of the blood surrounding the sheath 25 presses the sheath against the outer faces of transducer elements 21 and 22 while their inner faces are exposed to atmospheric pressure. Thus, the sheath 25 provides a flexible encapsulation for the transducer elements.

In FIG. 7 the ledges 41 for seating the distal ends of transducer elements 21a and 22a are omitted from the hemispherical end portion 31 of support 20a. The proximal ends of the transducer elements are adhesively secured to the ledges 40 on cylindrical portion 34, allowing the distal ends to bend as cantilever beams in response to external fluid pressure. The same result may be accomplished by merely making the transducer elements too short to reach to the ledges 41 on the end portion 31, in which case the support 20a in FIG. 7 may be identical with the support 20 in FIG. 4. Catheter tube 10 and sheath 25 are omitted from the view in FIG. 7, these parts being the same as in FIG. 1.

The transducer elements 21, 22, 21a and 22a are preferably piezo resistive devices and may be of various well known types commonly used for strain gauges, phonograph pickups and other purposes. For example, the element may comprise a silicon crystal 60 on an insulating substrate 61 or the layer 60 may be a thin layer of P type silicon epitaxially deposited on a thicker layer of N type silicon, the two layers forming a diode wherein the N type layer functions as an insulating substrate. The manufacture and characteristics of such elements are well understood in the art and need not be described in further detail. A three layer transducer element may also be used having two layers 60 on opposite sides of substrate layer 61.

Although only one element 21 or 22, or 21a or 22a, is necessary, the sensitivity is doubled and temperature compensation is accomplished by using two transducer elements with their faces reversed as shown in FIGS. 1 and 7. The dissimilar materials 60 and 61 act as a bimetal thermostat when subject to a change in temperature. This effect is neutralized by placing the layer 60 outermost in the elements 21 and 21a and innermost in the elements 22 and 22a and connecting the two elements in two branches of a bridge circuit as shown, for example, in FIG. 9.

Battery 65 applies a potential across elements 21 and 22 and potentiometer resistance 66. An indicating or recording meter 67 is connected between potentiometer tap 68 and a connection 69 between 21 and 22. The same circuit is used for transducer elements 21a and 22a in FIG. 7. The inherent temperature compensation just described permits the bridge circuit to be balanced at ambient temperature without the balance being disturbed by the change to body temperature when the catheter is introduced into a blood vessel.

In FIG. 1 external fluid pressure bends the transducer elements 21 and 22 inward, compressing layer 60 on element 21 and stretching layer 60 on element 22. These opposite physical distortions produce opposite changes in electrical resistance which are added together in the bridge circuit as indicated by meter 67. In FIG. 7 the inward bending of transducer elements 21a and 22a stretches layer 60 on element 21a and compresses layer 60 on element 22a with the resulting changes in resistance being additive as indicated by meter 67. The changes in electrical resistance in the bridge circuit produce instantaneous blood pressure messages in meter 67.

As shown in FIGS. 3, 7 and 8 the edges of side walls 32 of supports 20 and 20a are in the planes of the outer faces of transducer elements 21 and 22, and 21a and 22a, to support sheath 25 in contact with the outer faces of the transducer elements without the transducer elements being bent or deflected by the sheath.

Having now described our invention and in what manner the same may be used, what we claim as new and desire to protect by Letters Patent is:

1. A catheter pressure transducer assembly comprising a flexible plastic catheter tube, a rigid tip member having a tubular shank on its proximal end received in the end of said catheter tube and having a cylindrical portion abutting the end of said tube, a distal end on said tip member, a pair of opposite side walls extending between said cylindrical portion and said distal end, a pair of ledges on said cylindrical portion recessed between said side walls in spaced relation thereto, a pair of ledges on said distal end recessed between said side walls in spaced relation thereto, a pair of piezo resistive beam elements on opposite sides of said tip member supported on said ledges, the sides of said beam elements being spaced from said side walls so that said beam elements can flex freely between said side walls, an impervious flexible sheath surrounding said tip member, said side walls having edges in the planes of the outer faces of said beam elements to support said sheath in contact with said outer faces, and circuit wires in said catheter tube connected to said beam elements.

2. An assembly as defined in claim 1, said tip member having a web portion interconnecting said opposite side walls between said two beam elements.

3. An assembly as defined in claim 1 wherein said beam elements are held seated on said ledges by said sheath.

4. An assembly as defined in claim 1, said sheath comprising a pre-formed sleeve, and binding means overlying said shank binding said sleeve to said catheter tube and binding said catheter tube to said shank.

5. An assembly as defined in claim 1 including a lumen in said catheter tube communicating atmospheric pressure to the inside of said sheath and containing said circuit wires to said beam elements.

6. A catheter pressure transducer assembly comprising a flexible plastic catheter tube, a rigid tip member having a tubular shank on its proximal end received in the end of said catheter tube and having a cylindrical portion abutting the end of said tube, a distal end on said tip member, a pair of opposite side walls extending between said cylindrical portion and said distal end, a web interconnecting said opposite side walls, a pair of ledges on said cylindrical portion recessed between said side walls in spaced relation thereto on opposite sides of said web, a pair of ledges on said distal end recessed between said side walls in spaced relation thereto on opposite sides of said web, a pair of piezo resistive beam elements supported on said ledges on opposite sides of said web, the sides of said beam elements being spaced from said side walls so that said beam elements can flex freely between said side walls, an impervious flexible sleeve surrounding said tip member and holding said beam elements seated on said ledges, said side walls having edges in the planes of the outer faces of said beam elements to support said sleeve in contact with said outer faces, binding means overlying said shank binding said sleeve to said catheter tube and binding said catheter tube to said shank, and circuit wires in said catheter tube connected to said beam elements.

* * * * *

PO-1050
(5/69)

UNITED STATES PATENT OFFICE
CERTIFICATE OF CORRECTION

Patent No. 3,710,781            Dated January 16, 1973

Inventor(s) THOMAS B. HUTCHINS IV and MILES LOWELL EDWARDS

It is certified that error appears in the above-identified patent and that said Letters Patent are hereby corrected as shown below:

On the front page in Item [76] for "THOMAS B. HUTHCINS IV" read -- THOMAS B. HUTCHINS IV --.

Signed and sealed this 22nd day of May 1973.

(SEAL)
Attest:

EDWARD M. FLETCHER, JR.
Attesting Officer

ROBERT GOTTSCHALK
Commissioner of Patents